United States Patent [19]

Chaplin et al.

[11] Patent Number: 4,600,863
[45] Date of Patent: Jul. 15, 1986

[54] METHOD OF AND APPARATUS FOR ACTIVE VIBRATION ISOLATION

[75] Inventors: George B. B. Chaplin; Roderick A. Smith, both of Colchester, United Kingdom

[73] Assignee: Sound Attenuators Limited, Colchester, United Kingdom

[21] Appl. No.: 568,201

[22] PCT Filed: Apr. 19, 1983

[86] PCT No.: PCT/GB83/00116
§ 371 Date: Dec. 19, 1983
§ 102(e) Date: Dec. 19, 1983

[87] PCT Pub. No.: WO83/03700
PCT Pub. Date: Nov. 27, 1983

[30] Foreign Application Priority Data

Apr. 19, 1982 [GB] United Kingdom ............... 8211215
Jan. 13, 1983 [GB] United Kingdom ............... 8300809

[51] Int. Cl.$^4$ ........................................... H02K 33/00
[52] U.S. Cl. ............................... 318/114; 267/140.1; 381/71; 310/51
[58] Field of Search .............. 310/51; 267/140.1; 381/71; 318/114

[56] References Cited

U.S. PATENT DOCUMENTS

| 2,876,979 | 3/1959 | Barbera ...................... 267/140.1 |
| 2,919,883 | 1/1960 | Murphy ...................... 267/140.1 |
| 2,964,272 | 12/1960 | Olson .............................. 318/114 |
| 3,566,993 | 3/1971 | Leatherwood et al. ......... 310/51 X |
| 3,606,296 | 9/1971 | Chassagne . |
| 3,721,417 | 3/1973 | Skala .......................... 267/140.1 |
| 3,941,402 | 3/1976 | Yankowski et al. . |
| 4,005,858 | 2/1977 | Lochner . |
| 4,153,815 | 5/1979 | Chaplin et al. .................... 381/71 |
| 4,509,730 | 4/1985 | Shtarkman .................... 267/140.1 |

FOREIGN PATENT DOCUMENTS

| 0067548 | 12/1982 | European Pat. Off. . |
| 974578 | 11/1964 | United Kingdom . |
| 1020851 | 2/1966 | United Kingdom . |
| 1259802 | 1/1972 | United Kingdom . |
| 1586178 | 3/1981 | United Kingdom . |
| 989200 | 2/1983 | U.S.S.R. ......................... 318/114 |

Primary Examiner—Donovan F. Duggan
Attorney, Agent, or Firm—Dann, Dorfman, Herrell and Skillman

[57] ABSTRACT

Vibration isolation between a source (1) and a mounting (3) is provided by means of a vibration-cancelling actuator (4a) with a shear isolator (5) placed in series with the source (1). Mechanical and magnetic actuators are disclosed, a preferred mechanical actuator including its own shear isolation with a ratio of compliance in shear and axial directions of at least 50:1.

8 Claims, 10 Drawing Figures

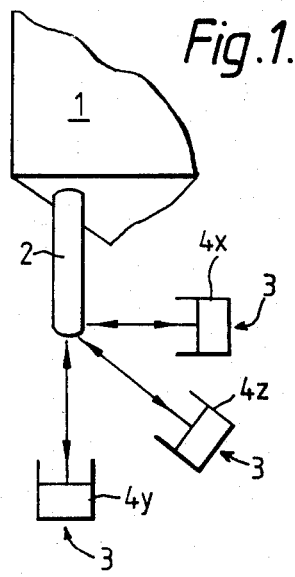
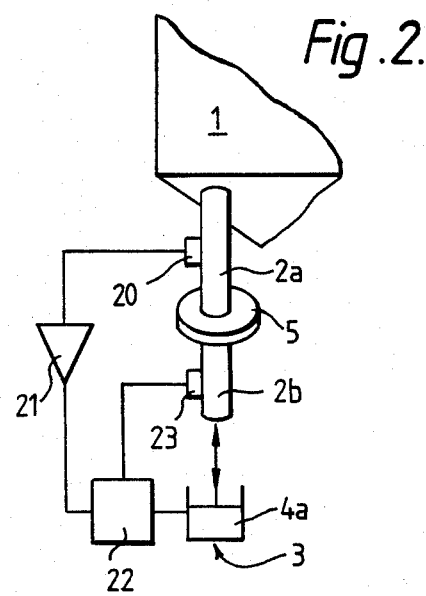
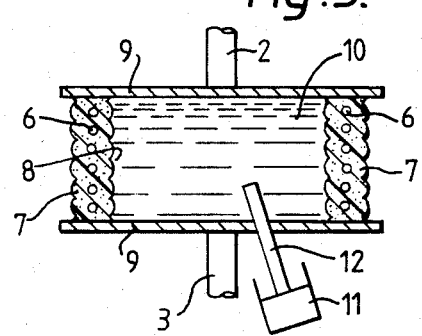
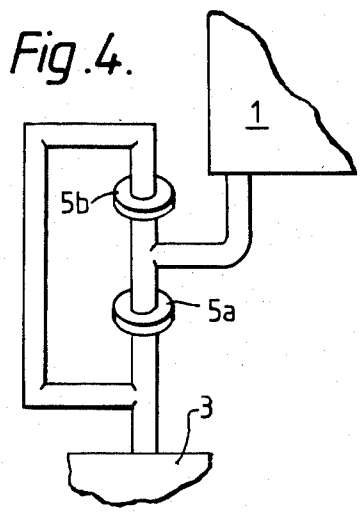
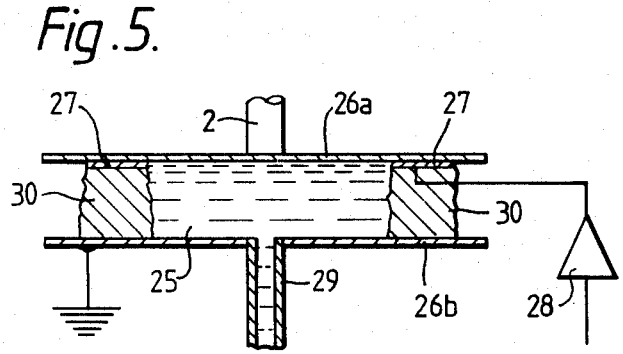

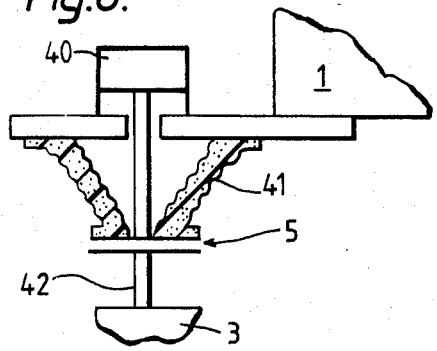
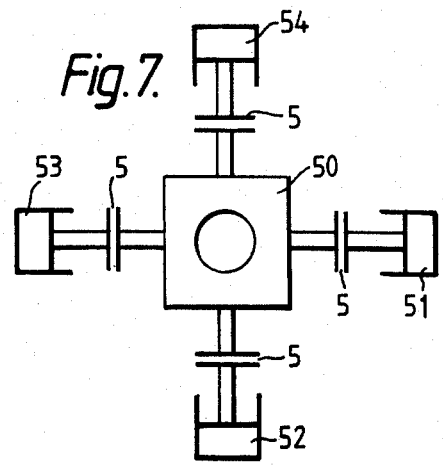
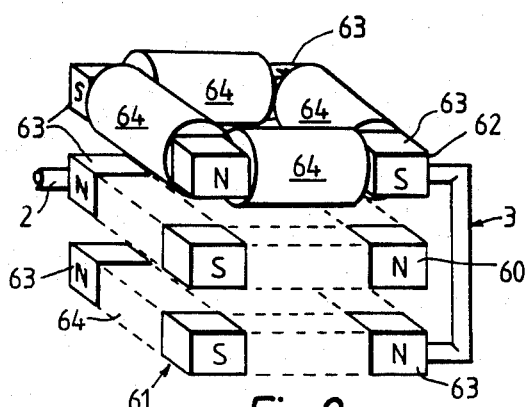
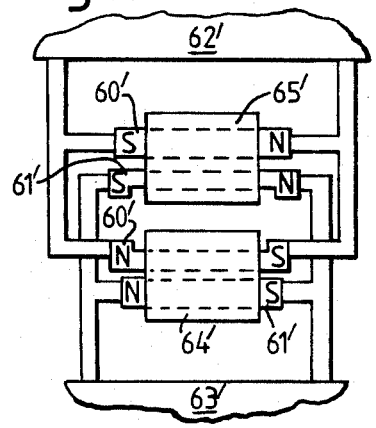
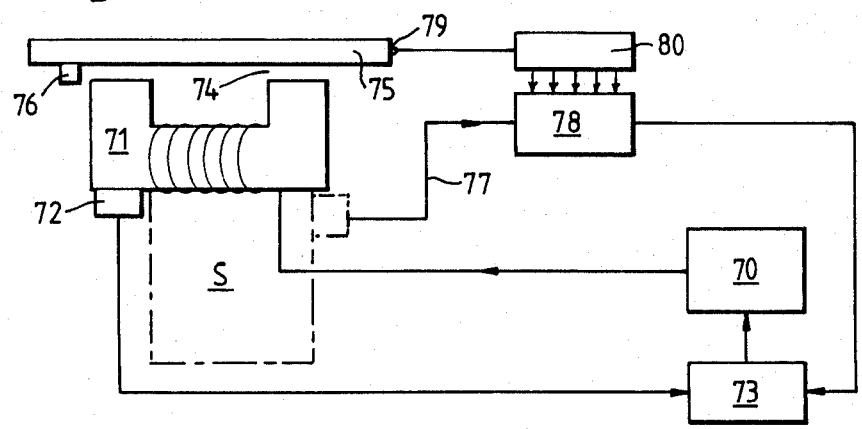

METHOD OF AND APPARATUS FOR ACTIVE VIBRATION ISOLATION

TECHNICAL FIELD

This invention relates to the reduction of vibration transmission from a source of vibration to a mounting of that source, by the use of vibration actuators (e.g. interposed between the mounting and the source) energised in such wise that the transmission of source vibration to the mounting is at least reduced and at best prevented.

The active control of noise and other vibration has recently become commercially important and this invention relates to the reduction or prevention of vibration transmission from a source of vibration such as a reciprocating engine (e.g. a marine propulsion plant) to the mounting means of that source (e.g. the chassis of a vehicle or the hull of a craft carrying the source).

The invention can be applied to the reduction of vibration transmissions from both repetitive and nonrepetitive sources but, in general, is expected to find its most important commercial applications in the attenuation of vibrations emanating from a repetitive source.

DISCUSSION OF PRIOR ART

Methods for the active attenuation of vibration are disclosed in U.S. Pat. Nos. 4,122,303 and 4,153,815, the former being concerned with the control of random vibrations and the latter with the control of repetitive vibrations. The techniques disclosed in these U.S. patent specifications are applicable to the control of the actuators described herein and the following disclosure will concentrate on the design of the actuators, it being assumed that the energising of the same will be clear from the above-noted specifications whose entire disclosure is herein incorporated by reference.

The active cancellation of vibration transmitted through machinery mounts conventionally requires the use of actuators operating in three mutually perpendicular directions at each mounting point because the source of vibration is usually multi-directional. Furthermore, the vibrational modes of the machinery mount couple vibration from one axis to another.

SUMMARY OF THE INVENTION

According to one aspect of the invention, a method of reducing the transmission of vibration from a source of vibration to a mounting of the source, comprises the employment of at least one vibration actuator and the energisation of the or each actuator to reduce the effect of source-derived vibration on said mounting, is characterised in that a shear decoupling means is provided in series with the source of vibration.

Conveniently the shear decoupling means is incorporated in the actuator whereby the or each actuator has substantial stiffness along a force-applying axis but is substantially compliant in the shear directions with a ratio of compliance in shear and axial directions of at least 15:1.

By ensuring that the vibration to be reduced can couple to the mounting through the vibration actuator along a single axis only, and applying the active opposing vibration along that axis, it is possible to operate satisfactorily with a single actuator at each mounting.

DECOUPLING MECHANISMS

Any or a combination of the following can be used to decouple the shear vibration at each actuator:

1. Planar air bearings or planar fluid bearings can be employed, using known technology.
2. Asymmetric elastomeric mountings can be used, whose compliance is substantially greater in shear than in compression, e.g. using a multi-layer elastomer-metal shim sandwich.
3. As in (2) above, but using an elastomer-metal washer sandwich to provide a hollow mounting.
4. Mountings as in (2) above, but having a spaced coil of a tensile material, e.g. steel, instead of shims.
5. Either (3) or (4) above could be sandwiched between two plates and then filled with a suitable fluid, such as water, to increase the stiffness in compression, whilst still retaining compliance in shear.
6. Mechanical bearings, consisting of two plane surfaces interspersed with ball or roller bearings. In the case of roller bearings, only one of the tangential axes is decoupled and a second similar bearing is required at right angles. Planar ball bearings, however, have a quite limited load-bearing capacity.
7. A spring wire, or a spar in tension with bearings at each end, between the mounting and a suspension attached to the source.
8. An electro-viscous material contained between electrodes, and
9. Magnetic bearings of various types.

BRIEF DESCRIPTION OF DRAWINGS

The invention will now be further described, by way of example, with reference to the accompanying drawings, in which:

FIG. 1 is a prior art arrangement in which three actuators are required at each mounting, FIG. 2 is a schematic indication of how shear isolation of the mounting permits a single actuator to be used, FIG. 3 shows a simple form of electrodynamic actuator for use in the method of the invention, FIG. 4 shows schematically how a pair of shear isolators can be used to provide a load-bearing capability even when a mounting is inverted, FIG. 5 shows a shear-isolated actuator based on electro-viscous control techniques, FIG. 6 shows the series connection of a vibrationnulling actuator and a passive elastomeric mount, FIG. 7 shows, in cross-section, an active bearing for nulling the vibrational effects of an eccentric shaft, FIGS. 8, 9 and 10 show magnetic actuators for use in the method of the invention.

DESCRIPTION OF PREFERRED EMBODIMENTS

FIG. 1 shows a machine 1, having a mount 2 which is linked to a support structure 3 by three actuators 4x, 4y and 4z acting respectively in the mutually orthogonal x-, y- and z- directions. By sensing the vibrations of the machine 1 at each mount in the three directions and energising the actuators at each mount to counteract the components of the vibration, the structure 3 can be made vibrationless.

FIG. 2 shows how the three actuators 4x, 4y and 4z in FIG. 1 can be replaced by a single actuator 4a acting in the axial direction of a mount 2a, 2b, with a shear isolator 5 providing negligible transmission of any vibration components in the y- and z-axes from mount part 2a to mount part 2b across the isolator 5.

The vibration of the mount part 2a in the axial direction of the part 2a is sensed by an accelerometer 20 feeding its output to an amplifier 21 which in turn drives the actuator 4a. The electronic link between 4a and 20 is arranged so that the vibration applied to the mount part 2b by the actuator 4a cancels out the vibration from the machine 1 passing across the isolator 5. To improve the accuracy of cancellation, the circuit 20, 21, 4a can include a modifier 22 controlled by a residual vibration sensor 23.

Where the machine 1 generates vibrations which are predominantly repetitive in nature, the repetitive component can be eliminated by using the accelerometer 20 as a source of symchronising signals for the repetition rate and replacing the amplifier 21 by a waveform generator whose waveform is modified by an adaption unit controlled by the output of the residual sensor 23. This method of control is well described in the previously mentioned U.S. Pat. No. 4,153,815 and will not be further detailed here.

FIG. 3 shows one practical embodiment of shear isolator which comprises a highly compliant helical spring 6 of high tensile wire embedded in an annulus of highly compliant elastomeric material 7 to define a cylindrical volume 8 between upper and lower plates 9 which is filled with an incompressible fluid 10. A conventional electrodynamic actuator 11, having a piston 12 protruding into the volume 8, is used to generate the required nulling vibrations in the mount 3. The spring 6 gives radial strength to the elastomeric annulus 7 (preventing radial expansion on pressure increase) without allowing the elastomeric annulus to transmit any significant force in the radial direction. In a typical case, the ratio of the compliance in shear of the isolator shown in FIG. 3 to its compliance in the axial direction is greater than 50:1 (preferably greater than 100:1).

To prevent bodily motion of an engine or machine (e.g. when a vehicle or vessel carrying the engine leans or accelerates sideways), the mounts 2 could be angled to prevent sideways motion in a first plane. A second pair of mounts angled in a plane at right angles to the first would similarly prevent motion in that second plane. This mounting arrangement would, however, leave the machine free to rotate through either axis of motion, and if this motion proved troublesome, additional mounts could be provided acting tangentially to the rotation to prevent the motion. In cases where the motion of a seating could be sufficiently severe to place the mounts in tension, opposing pairs of isolators 5a, 5b could be used as shown in FIG. 4, thus maintaining the machine 1 in position relative to the structure 3, despite mounting forces in either direction.

The motion of many large machines, when freely suspended, is small compared to the throw of conventional vibration actuators and a mechanical impedance transformation may be desirable to ensure optimum efficiency. This transformation is achieved with the actuator shown in FIG. 3, the mechanical advantage then being equal to the ratio of the cross sectional areas of the volume 8 and the piston 12. Alternatively, a diaphragm or flexible tube can be connected to the fluid-filled volume 8 and this diaphragm or flexible tube used to transmit the vibration to the fluid-filled mount or conventional hydraulic control valves can be used to control the pressure within the volume 8.

FIG. 5 shows how an actuator can be formed using an electro-viscous fluid 25 disposed between two force plates 26a, 26b. The lower force plate 26b has an earthed surface contacting the fluid 25 whereas the plate 26a has a conducting annulus 27 connected to a voltage supply schematically indicated by the amplifier 28. The plate 26a is connected to the machine 1 and the plate 26b is connected to the support structure 3 and is provided with a duct 29 through which pulses of fluid 25 are supplied to absorb the vibrations which would otherwise pass through the fluid from the machine 1 to the plate 26b.

The existence of a potential difference between the ring 27 and the plate 26b causes an annular wall 30 of solidified fluid 25 to form and create an actuator between the plates 26a, 26b, which transmits axial vibrations but has a high degree of shear isolation in the plane of the plate 26b.

By providing a series of conducting arrays on the plate 26a (e.g. a concentric series of annuli), the shape of the volume of fluid 25 contained between the plates 26a, 26b by the wall 30 can be varied at will. This facilitates control of the mechanical impedance presented by the actuator.

Where the actuator has to support both the static (and motion-induced) forces and the dynamic vibrational forces, it may be desirable to relieve the actuator of the static forces, and limit its use to dynamic vibration. As an example, a control loop, acting at a relatively low frequency, can be provided to take the static and motional forces from the vibrational actuator e.g. a stepping motor mechanism suitably coupled to the piston 12 (see FIG. 3).

The advantages of active cancellation achieved across a conventional elastomeric mount can be combined with isolation using the decoupling mechanisms described above. As shown in FIG. 6, an electromechanical actuator 40 can be connected directly across the elastomer 41 of an elastomeric mount 42. The elastomeric mount 42, in parallel with the active cancellation system provided by the actuator 40, would be connected in series with a shear decoupling device 5.

In the case where vibration is induced from an eccentric shaft within a bearing 50 (see FIG. 7), the motion of the bearing can be made to track that of the shaft by the use of four vibration actuators 51 to 54 mounted as shown to provide dynamic positioning of the bearing 50. Shear isolators 5 are provided between each actuator and the bearing. Since the mounts to each actuator can be made stiff to any frequencies not synchronised to the motion of the shaft, in a manner described in U.S. Pat. No. 4,153,815, the system would be load-bearing. In addition, the effect of the motion of a vehicle or vessel on the alignment of the bearing 50 connecting a motor or machine to the vehicle or vessel could be automatically compensated by the use of additional control loops operating on one or more of the actuators 51–54 to null (or partially null) the force on the bearing 50 or its displacement from its desired alignment. The effect could be, for example, motion of the engine or machine on its conventional mounts or distortion of the vehicle or vessel due to its incompletely rigid nature.

Where it is deemed important to have three mutually orthogonal actuators at any machine mount the shear decoupling principle described above can be used to prevent mutual interference between the three actuators.

Magnetic actuators can also be employed in accordance with the invention, and many designs of such actuators provide the required degree of shear isolation.

FIG. 8 shows one such actuator where a quadripole layer 60 attached to the source of vibration is sandwiched between two similar quadripole layers 61 and 62 attached to the seating of the source (a purely schematic connection has been shown in FIG. 8). Each quadripole layer comprises four blocks 63 of ferromagnetic material and four coils 64 wound on ferromagnetic cores interlinking the blocks 63. The coils 64 produce similar poles at opposite corners of the layers. Only three layers have been shown in FIG. 8, but in practice any number of layers could be used, the successive layers alternately opposing and attracting each other. The coils are energised in concert to absorb the main vibration coming from the source but, in addition, selected pairs of coils in each layer can be controlled to eliminate inter-layer torques which can develop during use.

FIG. 9 illustrates a multiple stacking of moving iron electromagnetic actuators. Alternate pole pieces 60', 61' are mechanically joined, one set (60') being fixed to an engine or other vibration source 62' being supported, the other set (61') being mechanically joined to a seating or support 63'. The structural supports of the pole pieces are non-magnetic so they do not complete magnetic paths. Coils 64', 65' are wound around pairs of pole pieces 60', 61', such that alternate pairs of pole pieces are energised in alternate directions. This produces alternate repulsive and attractive forces, which all contribute to the support and vibrational force. The coils 64', 65' are desirably resiliently mounted so that they do not transmit vibration to the field in which the poles 60', 61' are located.

FIG. 10 illustrates a method in which the known technology for vehicular levitation can be modified to provide a shear isolated actuator. An amplifier 70 supplies energising signals to an electromagnet 71 attached to the source 72 of the vibration. The flux through the magnet 71 is measured by a flux detector 72 and is controlled by a feedback loop 73. A gap 74 exists between the poles of the magnet 71 and the seating 75, below which the source S is to be non-vibrationally supported. The gap 74 is controlled from a gap sensor 76 which controls the demanded force from the flux-detecting feedback loop 73. (The flux is proportional to the force.) The flux detector 72 can be of any conventional design.

To control the energisation of the magnet 71 to ensure the repetitive vibration generated by the source S does not affect the seating 75, synchronising signals are taken from the source S on a line 77 and fed to a waveform generator 78, whose output is fed to the feedback loop 73. Adaptation of the waveform put out by the generator 78 can be effected via an accelerometer 79 on the seating 75 feeding its output to an adaption unit 80 (e.g. in the manner described in U.S. Pat. No. 4,153,815).

We claim:
1. A method of reducing the transmission of vibration along a path leading from a source of vibration to a mounting of that source, which method comprises the employment of at least one vibration actuator and the energization of each actuator to reduce the effect of source-derived vibration on said mounting, the improvement which involves including shear decoupling means in the vibration path between the source of vibration and the mounting by forming each actuator as a volume of incompressible fluid defined in part by a peripheral containing wall which allows shear movements between the axial ends thereof but which is substantially resistant to radial expansion on a pressure rise within said volume, whereby the actuator has a much higher compliance in the transverse direction than in the axial direction.

2. A method as claimed in claim 1, in which the ratio of the compliance in the shear direction to the compliance in the axial direction exceeds 50:1.

3. A method as claimed in claim 1, in which the peripheral containing wall of the actuator comprises a highly compliant elastomeric material embedding a highly compliant helical spring of high tensile strength wire.

4. A method as claimed in claim 1, in which energization of the actuator is effected by means provided to alter the volume of imcompressible fluid constrained within the actuator.

5. A method as claimed in claim 1, characterised in that the peripheral containing wall is formed by an electro-viscous fluid solidified by an electric potential applied thereto.

6. A method as claimed in claim 5, characterised in that the radius of the peripheral containing wall can be varied by varying the electrodes to which the electric potential is applied.

7. Apparatus for reducing the transmission of vibration from a source of vibration to a mounting of the source, comprising support means linking the mounting to the source, a vibration actuator acting on the mounting and means to energise the vibration actuator so that source vibrations are attenuated in the support means, characterised in that the support means includes shear decoupling means having a ratio of compliances in one direction and in each of the two mutually orthogonal directions which is 1:at least 15.

8. A shear isolator comprising first and second rigid members spaced-apart by an elastomeric material characterised in that the elastomeric material comprises a peripheral containing wall reinforced by a helical spring, in that the volume within the wall between said first and second members is filled with an incompressible fluid, and in that the ratio between the compliance of said first member relative to said second in shear and in the axial direction of said peripheral containing wall is greater than 50:1.

* * * * *